(12) United States Patent
Chow et al.

(10) Patent No.: US 8,185,552 B1
(45) Date of Patent: May 22, 2012

(54) USER-DEFINED CLASSIFIEDS

(75) Inventors: Alfred L. Chow, Plano, TX (US); Sivakumar Chinnasamy, Burlington, MA (US); Douglas G. Heatherly, Coppell, TX (US); Eric D. Chandler, Grapevine, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1178 days.

(21) Appl. No.: 11/231,046

(22) Filed: Sep. 20, 2005

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 2002/0091623 A1* | 7/2002 | Daniels | 705/37 |
| 2003/0040976 A1* | 2/2003 | Adler et al. | 705/26 |
| 2003/0171975 A1* | 9/2003 | Kirshenbaum et al. | 705/10 |
| 2003/0204449 A1* | 10/2003 | Kotas et al. | 705/27 |
| 2004/0024639 A1* | 2/2004 | Goldman | 705/14 |
| 2004/0098663 A1* | 5/2004 | Rey et al. | 715/500 |
| 2006/0095370 A1* | 5/2006 | Seth et al. | 705/40 |

* cited by examiner

*Primary Examiner* — Isaac M Woo

(57) ABSTRACT

A system and method for creating and classifying listings within user-defined marketplaces. An information database in communication with an information application comprises a plurality of marketplaces and a plurality of listings respectively classified within the plurality of marketplaces. The marketplaces stored in the information database may be either pre-defined or user-defined. User-defined marketplaces are created based at least in part on information supplied by an access device in communication with the information database.

16 Claims, 8 Drawing Sheets

USER-DEFINED CLASSIFIEDS

RELATED APPLICATIONS

The present application is related to U.S. patent application Ser. No. 11/060,243, entitled "IMPROVING SEARCH RELEVANCE AND YELLOW PAGE CLASSIFICATION INTEGRATION BY USING BUSINESS PROFILE CONTENT AND VERTICAL INDUSTRY TEMPLATES", filed on Feb. 17, 2005, U.S. patent application Ser. No. 11/060,209, entitled "METHOD FOR EXTRACTION AND SELECTION OF ENHANCED BUSINESS INFORMATION FROM WEBSITES, BUSINESS PROFILES AND ADVERTISING PRODUCTS", filed on Feb. 17, 2005, U.S. patent application Ser. No. 10/948,425, entitled "BUSINESS RATING PLACEMENT HEURISTIC", filed on Sep. 23, 2004, and U.S. patent application Ser. No. 10/680,952, entitled "INFORMATION DISTRIBUTION SYSTEM", filed on Oct. 8, 2003, which claims priority to U.S. Provisional Application No. 60/505,597, filed Sep. 24, 2003, titled "INFORMATION DISTRIBUTION SYSTEM". The contents of all of these applications are hereby incorporated by reference in their entirety.

BACKGROUND INFORMATION

Various forms of classified-type advertising have existed for many years. According to one traditional approach, an individual or organization interested in advertising an item or service for sale, or in advertising a need for a particular item or service, pays a nominal fee to a print-based advertising service, such as a local newspaper, to run a simple print advertisement detailing the item or service for sale or the item or service desired. Traditionally, this simple print advertisement is then printed by the local newspaper in a section of the newspaper where similar advertisements are grouped into pre-defined categories so as to be readily navigable by readers of the newspaper.

Although these simple print-based advertisements, commonly referred to as "classified advertisements" (or simply "classifieds", for short), provide individuals and organizations with the ability to advertise items, services, announcements or needs to a pre-defined subset of the general public for a relatively nominal fee, they suffer from a number of limitations.

For example, in the case of a classified advertisement placed in a local newspaper, the number of people that might potentially be exposed to the advertisement is limited to the readership of the local newspaper. When greater exposure is desired, an individual's or organization's only traditional alternative has been to place the classified advertisement in a newspaper having a larger readership, such as a general circulation or regional newspaper. However, regardless of the circulation size of the newspaper, the exposure or reach of the classified advertisement is limited to the readership of the newspaper, be it large or small.

The rigid exposure and reach limitations of traditional print-based classified advertisements are especially bothersome when an individual or organization is interested in selling an item that is difficult or costly to ship, is of too low a value to justify the travel time potential buyers must expend in evaluating the item for sale, or is better targeted to a specific subset of the general population, such as a community, neighborhood, workplace or other affinity group. These exposure and reach limitations may also prove to be time and price prohibitive, since potential buyers of items and services may not have the patience to wade through an entire city's list of classified advertisements when they are only interested in items or services offered within their local community or neighborhood.

For example, an individual interested in selling a used children's bicycle for $20 is unlikely to place a classified ad in a major city newspaper listing this item due to the low value of the item relative to the cost of the ad and the low probability that a potential buyer would be willing to drive across a big city to examine and/or purchase this low-cost item. Items such as a used children's bicycle are more appropriately offered for sale within a more localized community, neighborhood or affinity group. Conventional print-based classified advertising systems, however, fail to serve as an effective or efficient system or method for advertising such items.

In recent years, with the increased popularity of the Internet, various attempts have been made at modifying traditional print-based classified advertising models to take advantage of the ease-of-use, accessibility and exposure afforded by the Internet. According to one conventional approach, an online classified provider allows users to create online classified postings containing a description of the items or services they wish to buy or sell, usually in consideration for a nominal fee. These classified postings are then published by the online classified provider on a centralized public website for viewing by members of the general public via the Internet.

Typically, when creating these online classified postings, users are asked to select a pre-defined category or subcategory under which the user desires the posting to be classified. These categories and subcategories are defined by system administrators of the online classified system and are usually based on a conventional taxonomy classification system. For example, an individual interested in selling a portable notebook computer might create an online classified posting detailing the specifics of the computer for sale, such as the speed of the computer's processor, the size of its hard drive and the asking price. In this situation, the user might decide to have this post classified under the administrator-defined category of "Computers", or further classified under the administrator-defined subcategory of "Computers—Laptops".

However, because online classified postings are, according to this conventional approach, classified by specific administrator-defined categories and subcategories irrespective of their geographic location, potential buyers using this online classified system may only locate items or services relevant to their needs by browsing through or searching within these administrator-defined categories and subcategories. Thus, conventional online classified systems fail to serve as an efficient or effective system for buying or selling items or services that are more appropriately exchanged within a localized geographic region, such as items that are difficult or costly to ship or are of too low a value to justify the travel costs associated with obtaining the item. Conventional online classified systems additionally fail to provide an effective system and method for buying or selling items or services that do not fall squarely within the administrator-defined categories and subcategories.

For example, an individual interested in selling a shovel would be unlikely to purchase an online classified advertisement through conventional online classified systems given the low value of the item relative to the costs associated with shipping this item. Classified advertisements publicizing the sale of items such as this shovel are more appropriately targeted to a specific or localized subset of the general population, such as a community, neighborhood, workplace or other affinity group.

According to another conventional approach, users of an online classified system are given the option of classifying online classified postings according to certain administrator-defined geographic regions, such as a state or a city. As with the administrator-defined categories and subcategories discussed previously, the geographic regions with which an online classified posting can be associated are pre-defined by system administrators of the online classified system. In an effort to avoid complexity, system administrators of conventional online classified systems limit these geographic regions to states or highly populated cities. Online classified postings may also be further classified into administrator-defined categories and subcategories within these administrator-defined geographic regions in essentially the same manner as described above.

However, as with traditional print-based classified advertising, users of these conventional online classified advertising systems are forced to classify online classified postings within specific administrator-defined geographic regions, categories and subcategories specified by the online classified provider. Because the administrator-defined geographic regions are limited to states or highly populated cities, an individual interested in selling a used children's bicycle for $20 is again unlikely to purchase an online classified ad listing this item due to the low probability that a potential buyer would be willing to drive across a state or a big city to examine and/or purchase this low-cost item.

Thus, conventional online classified advertising systems fail to remedy all of the limitations of print-based classified advertising systems. In particular, conventional online-based classified advertising systems fail to serve as an effective or efficient system and method for advertising items or services that are better targeted to a more localized subset of the general population, such as a neighborhood, workplace or other affinity group.

Accordingly, there exists a need for a comprehensive online classified advertising system and method capable of allowing individuals and organizations to create user-defined categories, subcategories and geographic locations (collectively, "user-defined marketplaces"), within which items, services and/or information may be offered, requested, and/or exchanged. There also exists a need for a system and method for allowing individuals, organizations and other affinity groups to exercise control over various aspects of these user-defined marketplaces, such as how these user-defined marketplaces are to be classified and relate to other categories and/or geographic locations, what content may be posted within these user-defined marketplaces, and to whom and when access to these user-defined marketplaces is to be granted. Such a system and method would advantageously facilitate the exchange of items, services and information within a virtual marketplace specifically tailored to an individual's or organization's particular needs and domains of interest.

DETAILED DESCRIPTION OF PREFERRED EMBODIMENTS

I. System Overview

Figure 1:
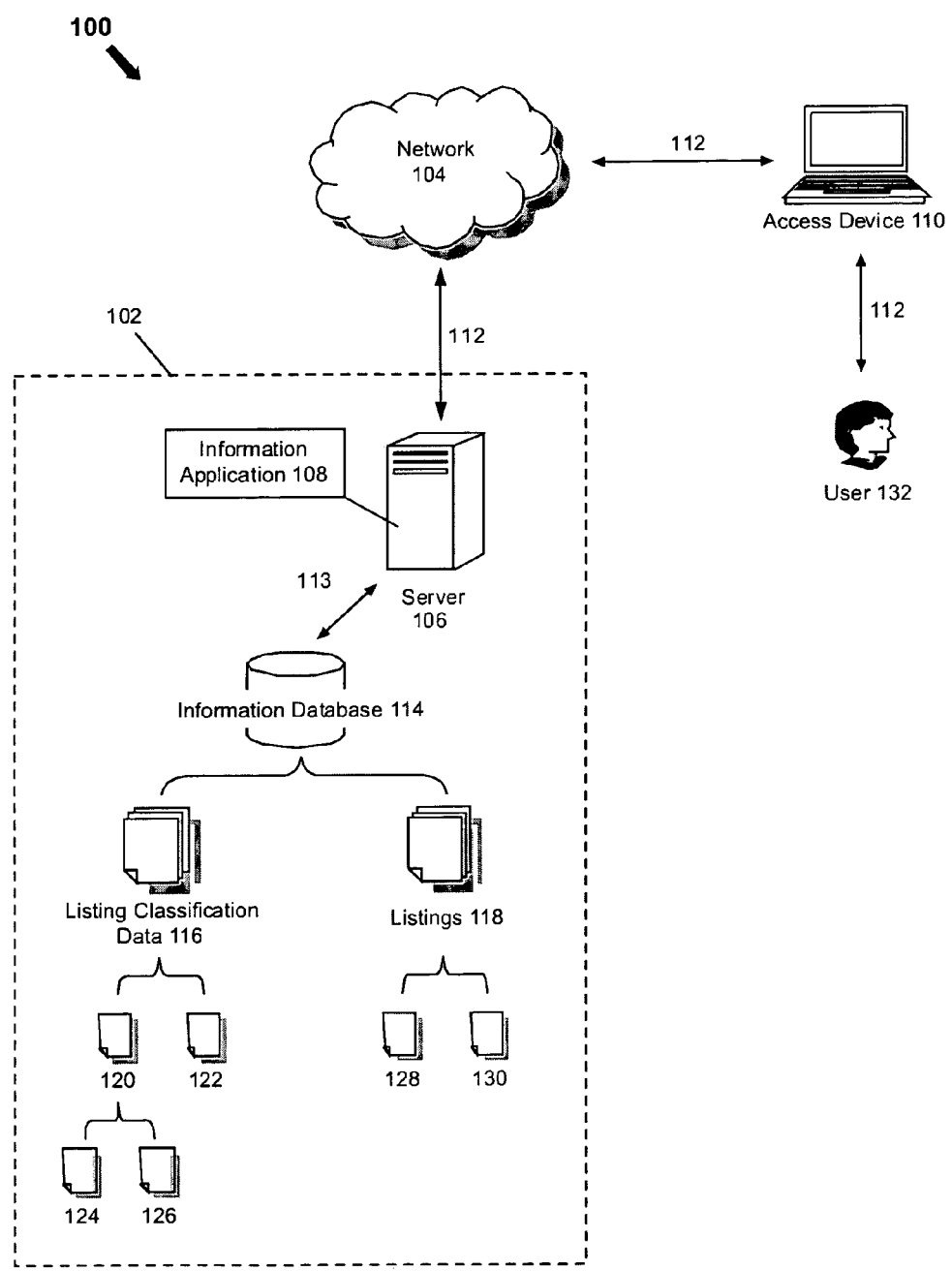
FIG. 1 is a block diagram illustrating an exemplary physical infrastructure of a system implementing an information platform.

FIG. 1 depicts an exemplary physical infrastructure of a system 100 that implements an information platform 102. According to at least one embodiment, system 100 comprises a network 104 for establishing communication between a server 106 providing an information application 108 and an access device 110 via various connections 112. Connections 112 may include any number of connections recognized in the art, including, for example, wires, wireless communication links, fiber optic cables, etc. Network 104 may represent any number of telecommunications or computer networks known to those skilled in the art, including, for example, an intranet, a wide area network (WAN), a local area network (LAN), or the Internet.

Information platform 102 includes server 106, which, according to some embodiments, is a Web server computing device well known to those skilled in the art. Server 106 communicates with access device 110 over network 104 via connections 112. In many embodiments, access device 110 is a computing device such as a laptop, notebook, desktop, or handheld or mobile computing device. Access device 110 generally includes a display and one or more input devices such as a keyboard and/or pointing device or other input device known to those skilled in the art. In some embodiments, access device 110 is capable of running a Web browser, as will be known to those skilled in the art, which may be in communication with information application 108. Access device 110 may also be configured to communicate with server 106 and/or information application in accordance with any number of protocols or formats, such as HyperText Transport Protocol (HTTP), Really Simple Syndication (RSS) and/or Extensible Markup Language (XML).

Information platform 102 further includes an information database 114. Server 106 and information application 108 communicate with information database 114 via connection 113, which may be one or more types of connections as described above in connection with connections 112. In many embodiments, information application 108 is a software application executed within server 106 and/or information database 114. In addition, although depicted in FIG. 1 as physically separate devices, in some embodiments server 106 and information database 114 exist on a single physical computing device and/or are embodied in a single software application. Further, those skilled in the art will recognize that server 106 and/or database 114 may include more than one server 106 and/or database 114. Information database 114 generally includes, among other things, listing classification data 116 and listings 118.

Listing classification data 116 contains data generally relating to marketplaces under which listings 118 may be classified and organized. The term "marketplace" is to be construed broadly as generally referring to any type of virtual forum in which items, services, and/or information may be offered, requested, provided, obtained, shared, and/or exchanged. In some embodiments, the term marketplace is synonymous with a classifieds category, a classifieds subcategory, and/or a geographic location. Marketplace may also refer a discussion forum, announcement board, or classifieds community.

Listing classification data 116 may comprise, among other things, administrator-defined marketplaces 120 and user-defined marketplaces 122. Administrator-defined marketplaces 120 are created by system administrators of information platform 102, while user-defined marketplaces 122 are created by users 132 who are provided access to the information database 114, as will be explained in greater detail below.

Administrator-defined marketplaces 120 generally comprise categorical classifications 124 and geographic classifications 126. Categorical classifications 124 generally include administrator-defined categories and subcategories under which listings 118 may be classified. Categorical classifications 124 may be broadly defined by system administrators to encompass a large number of listings 118, or may be more narrowly defined so as to encompass a more specific group of listings 118. Examples of broader categorical classifications 124 include "For Sale", "Help Wanted", "Community Organizations", "Religious Groups", etc., while examples of narrower categorical classifications 124 include "Consumer Electronics", "Health Care Jobs", "Youth Soccer Clubs" or "Baptist Congregations".

In some embodiments, listing classification data 116 contains data identifying the taxonomic relationship or relationships between each categorical classification 124 stored in information database 114, as specified by system administrators of information platform 102. For example, listing classification data 116 might contain data defining the categorical classification "Consumer Electronics" as a species within the genus of the categorical classification "For Sale," "Health Care Jobs" as a species of the genus "Help Wanted", "Youth Soccer Clubs" as a species of the genus "Community Organizations", "Baptist Congregations" as a species of the genus "Religious Groups", and so on. Classification of taxonomy data is discussed in greater detail elsewhere, for example, in U.S. patent application Ser. No. 10/680,952.

Administrator-defined marketplaces 120 may also include geographic classifications 126. Geographic classifications 126 relate generally to a geographic area or region under which listings 118 may be classified. For example, geographic classifications 126 might relate to a city, county, state, region, zip code or telephone area code. Specific examples of such administrator-defined geographic classifications 126 include "California", "Manhattan", "Arlington County", "Zip Code 84111" and "Area Code 703".

In many embodiments, listing classification data 116 also includes data identifying the hierarchical relationship between these various geographic classifications 126. For example, listing classification data 116 might contain data defining the geographic classification "San Francisco" as a city within the state geographic classification of "California", or the geographic classification "Zip Code 84111" as a zip code within the state geographic classification of "Utah".

Categorical classifications 124 may also be provided within a certain geographic classification 126, and/or various geographic classifications may be provided within a certain categorical classification 124. For example, the geographic classification of "San Francisco" might include the categorical classifications of "Housing", "For Sale" and "Help Wanted", while the categorical classification of "Religious Affiliations" might also include the geographic classifications of "Georgia", "Houston" and "Boston".

As detailed above, listing classification data 116 may also include user-defined marketplaces 122. User-defined marketplaces 122 may be created and defined by users 132 to provide a virtual forum for individuals in a region, group, organization or association, including, for example, neighborhoods, communities, church groups, universities, hobby clubs, businesses, places of employment, or other affinity groups. Once created, user-defined marketplaces 122 function similarly to administrator-defined marketplaces by providing a virtual forum in which items, services, and/or information may be offered, requested, provided, obtained, shared, and/or exchanged. Thus, user-defined marketplaces 122 provide users 132 with the ability to create marketplaces beyond those traditionally defined by system administrators, thereby allowing users 132 to dynamically tailor the scope and reach of listings 118 to their particular domain of interest. An exemplary manner and method for creating user-defined marketplaces 122 will be discussed in greater detail below in connection with FIGS. 2A and 2B.

In some embodiments, user-defined marketplaces 122 may be associated with or classified under pre-existing administrator-defined marketplaces 120. For example, the user-defined marketplace "Dallas Baptist Church" might be classified under the administrator-defined geographic classification of "Texas—Dallas" or the administrator-defined categorical classification of "Religious Groups". User-defined marketplaces 122 may also be "linked" to other related user-defined marketplaces 122 within information database 114. For example, the user-defined marketplace "Dallas Baptist Church" may be linked to other user-defined marketplaces created by neighboring churches, such as the "Methodist Church of Dallas" or the "Dallas Episcopalian Church".

Generally speaking, linking refers to a relationship or association between user-defined marketplaces 122 that is designated by creators or administrators of these user-defined marketplaces 122. Data detailing these linking relationships between user-defined marketplaces are contained generally within information platform 102, such as within information database 114 and/or listing classification data 116. Linking relationships between user-defined marketplaces 122 will be discussed in greater detail below in connection with FIGS. 2A and 2B.

As detailed above, information database 114 also includes listings 118. Listings 118 generally relate to advertisements or informational postings, such as classified advertisements or online discussion forum or message board postings, created or controlled by users 132 or system administrators of information platform 102. According to at least one embodiment, the attributes and content of listings 118 are stored as part of each listing 118. The attributes and content of listings 118 may also be stored additionally or alternatively in listing attribute data 128 and listing content data 130, contained within listings 118. In at least one embodiment, the attributes of listings 118 are contained in listing attribute data 128 and the content of listings 118 is contained in listing content data 130.

Listing attribute data 128 generally contains data relating to attributes about a specific listing 118. For example, listing attribute data 128 may include the contact information of the user who created listing 118, such as the address, phone number or email address of the user ("contact information attribute"), the geographic location to be associated with listing 118 ("geographic attribute"), and the marketplaces and/or the classifications that listing 118 is to be classified under ("classification attribute").

Listing attribute data 128 may further include information regarding the fees that user 132 pays for the display of listing 118 ("fee-type attribute"). For example, user 132 may pay a flat periodic fee (e.g., a fee paid weekly, monthly or annually), a classification-based fee (e.g., a fee that increases as the number of classifications with which listing 118 is to be associated increases), or a "per-hit" fee (e.g., a fee that is incurred every time a user 132 accesses a particular listing 118) for the display of listings 118. Fee-type attributes are discussed in more detail in U.S. patent application Ser. No. 10/680,952.

Listing content data 130 generally contains information about the item, service, announcement, message or need that user 132 desires to be listed in listing 118. For example, listing content data 130 might contain a detailed description of an item for sale, details about a neighborhood barbeque, information about a secretarial job opening, or a message that user 132 desires to communicate to members of an online discussion forum. Listing content data 130 might also contain various forms of electronic data or media, such as text, digital pictures, video clips or sounds. For example, listing content data 130 might contain digital pictures of artwork for sale or a digital video clip of a home for sale.

User 132 may interact with information platform 102 to create or control listings 118 or user-defined marketplaces 122 stored or to be stored in information database 114 or to obtain information about one or more of listings 118 stored in information database 114 in any number of ways, including, for example, via access device 110 over connection 112. User 132 may also create, control or obtain information about listings 118 and user-defined marketplaces 122 by interacting with information platform 102 through various information technology mechanisms known to those skilled in the art, such as software applications that are configured or adapted to interface with information platform 102. Such interfacing applications may interact with information platform 102 in an automated or manual manner, engaging in batch, real-time, scheduled, or ad-hoc interactions.

User 132 may be any person, company, organization, affinity group or other entity (including "virtual" entities, such as software applications) that uses information platform 102 to create, control or obtain information about listings 118 and/or user-defined marketplaces 122. In many embodiments, user 132 can be referred to as an advertiser, a seller, an announcer, a buyer, a purchaser, a consumer, a searcher, a discussion forum or message board participant, a leader, organizer, member or potential member of an affinity group or organization.

Although users 132 include offerors or potential purchasers of various goods, services, or other offerings, users 132 can also include individuals, organizations or affinity groups interested in communicating with others to pursue future interactions. For example, users 132 could be leaders, organizers, members or potential new members of churches and religious affiliations, political parties, community action groups, neighborhoods and communities, places of employment, hobby and enthusiast clubs, or team sports organizations.

Users 132 can also be any entity or individual seeking to provide information about itself to others, or to obtain information about the existence of another entity or individual, through one or more listings 118 residing in information database 114. For example, users 132 may be individuals interested in acquiring information about other individuals, or in providing information about themselves, for the purpose of pursuing potential personal or professional relationships.

Users 132 may also include individuals or organizations interested in providing or obtaining information about an event or other occurrence, such as, for example, a town hall meeting, a neighborhood carnival, or an estate sale. Users 132 may also include individuals interested in providing, obtaining or organizing information related to a specific topic or affinity group. For example, users 132 may include individuals interested in discussing team-sports, religious topics, technological advancements, relationship concerns, etc.

Although only one user 132 is displayed in FIG. 1, it is anticipated that millions of different users 132 may submit and receive information using information platform 102. The capacity of information platform 102 is only limited by the information technology architecture that supports the functionality of information platform 102 (for example, the number of servers 106 and/or information databases 114).

II. Creation of User-Defined Marketplaces

Figure 2A:
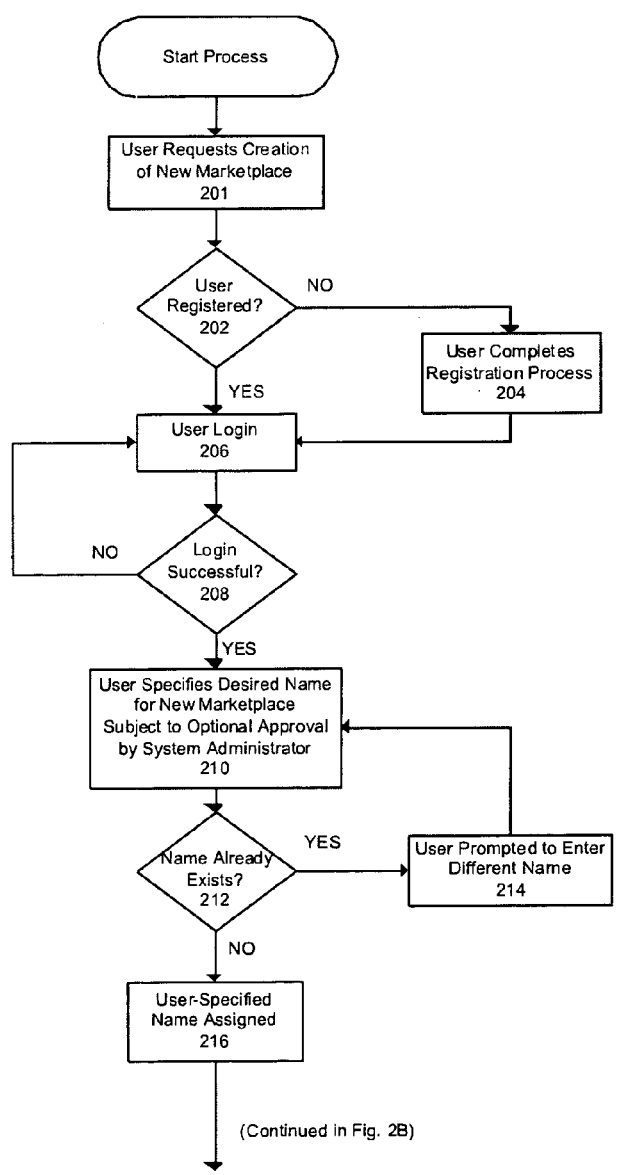
FIGS. 2A and 2B depict an exemplary process flow for creating user-defined marketplaces.
Figure 2B:
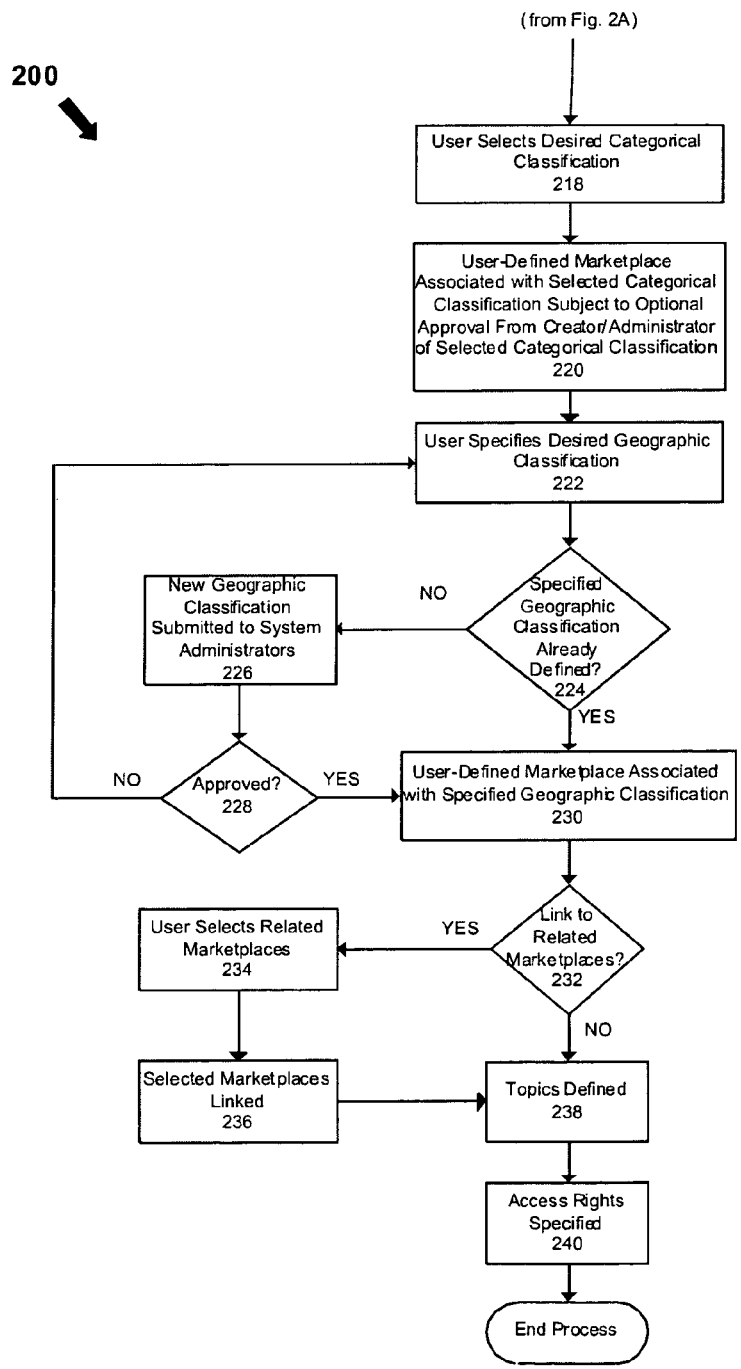

As detailed above, users 132 may create user-defined marketplaces 122 to provide a virtual forum for individuals in a region, group, organization or association. FIGS. 2A and 2B depict an exemplary process flow 200 for creating and classifying user-defined marketplaces 122. Process flow 200 may be implemented within information application 108, information database 114, information platform 102, and/or other appropriate portions of system 100, as will be known to those skilled in the art. In many embodiments, user 132 creates user-defined marketplaces 122 by interacting with various aspects of information platform 102 via access device 110.

In step 201, user 132 requests the creation of a new user-defined marketplace 122. User 132 may enter this request in any number of ways known in the art, including through access device 110. For example, user 132 may interact with a webpage hosted by a server such as server 106 to enter or select a request to create a new user-defined marketplace 122 via a data entry mechanism such as a keyboard or mouse connected to access device 110. This request may then be transmitted by access device 110 to server 106 and information application 108 via a connection or connections 112, 113 and/or network 104.

Upon receipt of the request for a new user-defined marketplace 122, at step 202 it is determined whether user 132 is a registered member/user of information platform 102. This may occur, for example, by displaying a prompt on access device 110 asking user 132 to specify whether he/she is a registered member of information platform 102. User 132 may then enter a response to this prompt via access device 110, which response may then be transmitted to server 106 and/or information application 108 via connections 112. If at step 202 user 132 specifies that he/she is a registered user of information platform 102, control proceeds to step 206 where user 132 may be prompted to enter login information. Otherwise, control proceeds to step 204.

At step 204, user 132 is prompted to complete a registration process. Persons of ordinary skill in the art will understand that the registration process depicted in step 204 can occur in any number of ways, including by prompting user 132 to enter various information or personally-identifiable indicia via access device 110, such as a name, address, email address, telephone number, etc. The registration process in step 204 may also entail requiring user 132 to define a username and/or password. Upon successful registration at step 204, the username and/or password defined by user 132 may be assigned to the user by information application 108.

The specific information required from user 132 to complete the registration process at step 204 is definable and customizable by administrators of information platform 102. In some embodiments, no information is required of user 132 and steps 202-208 are deemed optional. In other embodiments, steps 202-208 are mandatory.

At step 206, user 132 is prompted to enter the login information provided to user 132 upon registration with information platform 102. Upon entry of the requested login information, at step 208 it is determined whether the login information entered by user 132 matches registration records contained within information platform 102. If the login information provided by user 132 matches registration records contained within information platform 102, then control proceeds to step 210. Otherwise, control returns to step 206 where user 132 is again prompted to enter login information.

Once user 132 has successfully logged into information platform 102, at step 210 user 132 is prompted to enter the name by which the new user-defined marketplace 122 is to be called. Examples of potential names for user-defined marketplaces 122 include "Dallas First Baptist Church", "St. Louis Youth Soccer Clubs", "University of Maryland Alumni", "Indianapolis Rotary Club", etc. Upon entry and transmission of this name to information platform 102, at step 212 it is determined whether this name has already been used in connection with previously-defined marketplaces (administrator-defined or user-defined). If so, control proceeds to step 214 where user 132 is prompted to enter a different name. Otherwise, control proceeds to step 216 where the name specified by user 132 may be assigned to the new user-defined marketplace 122.

In certain embodiments approval by system administrators of information platform 102 may be required prior to assigning the name specified by user 132 at step 210 to the new user-defined marketplace at step 216. For instance, system administrators of information platform 102 may require user 132 to successfully demonstrate that he/she has the right to use the name specified at step 210 prior to assigning this name to the new user-defined marketplace. For example, system administrators of information platform 102 might require a user 132 to successfully prove ownership rights to the name "IBM" prior to allowing a user 132 to create a user-defined marketplace named "IBM Dallas". This approval process may, in some cases, prevent users 132 from creating marketplaces named after entities, organizations, etc. without having the appropriate right to use the desired name, or prevent users from using names that are outside the etiquette/decorum rules established by the administrators of platform 102.

As seen in the continued process flow diagram of FIG. 2B, at step 218 user 132 is prompted to select an administrator-defined categorical classification 124 under which user 132 desires the new user-defined marketplace 122 to be classified. User 132 may select this categorical classification 124 in a number of ways well known to those of skill in the art, including by selecting a categorical classification 124 from a drop-down menu displayed on a webpage using a mouse connected to access device 110 or by entering the name of the desired categorical classification 124 using a traditional data input device such as a keyboard. Generally speaking, users 132 may classify new user-defined marketplaces 122 under any pre-existing categorical classification 124, regardless of whether the scope of the selected categorical classification 124 is broad or narrow. For example, a minister of the Dallas First Baptist Church might decide to classify a new user-defined marketplace 122 named "Dallas First Baptist Church" under an administrator-defined categorical classification 124 named "Religious Affiliations". Upon selection of a categorical classification 124, the new user-defined marketplace 122 is then associated with and classified under the selected categorical classification 124 at step 220.

Associating user-defined marketplaces 122 with administrator-defined categorical classifications 124 in this exemplary manner enables each user-defined marketplace 122 to be organized and classified within the pre-existing taxonomic classification system detailed above, thereby facilitating the seamless integration of each new user-defined marketplace 122 into listing classification data 116. As described above, data detailing the taxonomic or hierarchal relationship between the new user-defined marketplace 122 and the selected categorical classification 124 may be stored within information platform 102, such as within server 106, information database 114, and/or listing classification data 116.

In certain embodiments user 132 may also specify whether he/she desires to classify the new user-defined marketplace 122 under a preexisting user-defined marketplace 122 prior to proceeding to step 222. For example, an engineer and congregational member of the Dallas First Baptist Church might create and classify a new user-defined marketplace named "Dallas First Baptist Church Engineers" (essentially, a "sub-marketplace") under the preexisting user-defined marketplace "Dallas First Baptist Church". In many embodiments, approval from the creators/administrators of the preexisting user-defined marketplace is required prior to allowing user 132 to classify the new user-defined sub-marketplace under this preexisting user-defined marketplace. Upon approval by creators/administrators of the preexisting user-defined marketplace, the new user-defined marketplace 122 may then be associated with and classified under the preexisting user-defined marketplace. As detailed above, data detailing the taxonomic or hierarchal relationship between the new user-defined sub-marketplace and the preexisting user-defined marketplace 122 may be stored within information platform 102, such as within server 106, information database 114, and/or listing classification data 116.

At step 222, user 132 is prompted to specify a geographic classification under which user 132 desires the new user-defined marketplace 122 to be classified. User 132 may specify this geographic classification in a number of ways well known to those of skill in the art, including by selecting a geographic classification from a drop-down menu displayed on a webpage using a mouse connected to access device 110 or by entering the name of the desired geographic location using a keyboard. When specifying this geographic classification, user 132 may either specify or select a pre-existing administrator-defined geographic classification 126, such as "Washington D.C.—Metro Area", or may specify a new user-defined geographic classification.

In many examples, user 132 may choose to specify a new user-defined geographic classification to more closely tailor the intended scope and reach of the new user-defined marketplace 122. For example, a user 132 living in the Ballston community of Arlington, Va. may be interested in associating a new user-defined marketplace 122 with a geographic classification that is more local or specific than the entire Washington, D.C. metro area. In this example, user 132 may decide to specify a previously-undefined geographic classification named "Ballston Community" or "Zip Code 22203".

At step 224, it is determined whether the geographic classification specified by user 132 already exists within the previously-defined geographic classifications 126 stored in information database 114 and/or listing classification data 116. If user 132 has selected a pre-existing geographic classification 126 or if a geographic classification 126 matching the geographic classification specified by user 132 at step 222 is located within information database 114, control proceeds to step 230 where the new user-defined marketplace 122 is associated with the specified geographic classification 126.

If, however, a matching geographic classification 126 is not located within information database 114, control proceeds to step 226. At step 226, the new geographic location specified by user 132 is submitted to system administrators of information platform 102 for approval as a new user-defined geographic classification. Although not illustrated in FIG. 2B, in many examples at step 226 a user 132 may also be required to select and submit an administrator-defined geographic location 126 under which the new user-defined geographic location is to be classified. For example, a user 132 interested in creating the user-defined geographic classification "Ballston Community" may also be required to specify that this community is to be classified under the previously-defined geographic classification "Washington D.C.—Metro Area". If approved, a new geographic classification is created and control proceeds through step 228 to step 230 where this new geographic classification is associated with the new user-defined marketplace 122. Otherwise, control returns to step 222.

At step 232, user 132 is prompted to specify whether he/she desires the new user-defined marketplace 122 to be linked to similar or related marketplaces. As detailed above, user-defined marketplaces 122 may be linked to other related user-defined marketplaces 122 within information database 114. For example, the user-defined marketplace "Dallas Baptist Church" may be linked to other user-defined marketplaces created by neighboring churches, such as the "Methodist Church of Dallas" or the "Dallas Episcopalian Church". Generally speaking, linking refers to a relationship or association between user-defined marketplaces 122 that is designated by creators or administrators of user-defined marketplaces 122.

User 132 may decide to designate this linking relationship with other user-defined marketplaces 122 for a number of reasons. For example, according to at least one embodiment, a creator or administrator of a user-defined marketplace 122 may link to a related marketplace to tailor the exposure and reach of the user-defined marketplace 122. For instance, a creator/administrator may limit the right to post or view listings 118 or to gain access to the contact information attributes of listings 118 within a user-defined marketplace 122 (collectively "access rights") based on whether a user 132 is a registered member of this user-defined marketplace 122 or a registered member of a linked marketplace. For example, the creator/administrator of the user-defined marketplace "Dallas First Baptist Church" may decide that access rights will only be granted to registered users of either the "Dallas First Baptist Church" marketplace or the linked marketplace "Methodist Church of Dallas".

By allowing creators or administrators of user-defined marketplaces 122 to set access rights based on whether a user is a registered member of a linked marketplace, creators/administrators of user-defined marketplaces 122 are thus able to grant access rights to a subset of users 132 that is larger than the number of registered members of a specific marketplace, but smaller than the total number of users 132 accessing information platform 102. The exposure and reach of each user-defined marketplace can thus be more specifically tailored to meet the needs of each marketplace. An exemplary method for determining and setting access rights is discussed in greater detail below in connection with step 240.

If at step 232 user 132 specifies that he/she desires to link the newly created user-defined marketplace 122 to other related or similar marketplaces, control proceeds to step 234; otherwise control proceeds to step 238. At step 234, user 132 selects the one or more previously-defined marketplaces that are to be linked to the newly-created user-defined marketplace 122. User 132 may select these marketplaces in any number of ways known to those of skill in the art, including, for example, by entering the desired marketplaces into search fields displayed on a webpage hosted by server 106 using a keyboard or by selecting from a drop-down menu using a mouse connected to access device 110 in communication with information application 108.

At step 236, the selected marketplaces are then linked to the new user-defined marketplace 122. Data detailing this linking relationship between the new user-defined marketplace 122 and the selected marketplaces may be stored within information platform 102, such as within server 106 or information database 114. Although not illustrated in FIG. 2B, in certain embodiments the marketplaces selected by user 132 in step 234 will not be linked until creators/administrators of the selected marketplaces approve of this linking relationship. In addition, the creation of this linking relationship may also be dependent upon approval by system administrators of information system 102.

At step 238, user 132 may be prompted to define various listing topics to be contained in the newly-created user-defined marketplace 122. The term "listing topics" generally refers to categories and sub-categories of interest under which listings 118 may be posted in marketplaces (user-defined or administrator-defined). For example, the user-defined marketplace "Dallas First Baptist Church" may contain the listing topics "Religious Discussion", "Items for Sale" or "Service Opportunities". In many embodiments, these listing topics are defined by a creator or administrator of user-defined marketplace 122. Alternatively, these listing topics may be defined by subsequent users 132 of user-defined marketplace 122 or by administrators of information platform 102.

Figure 3:
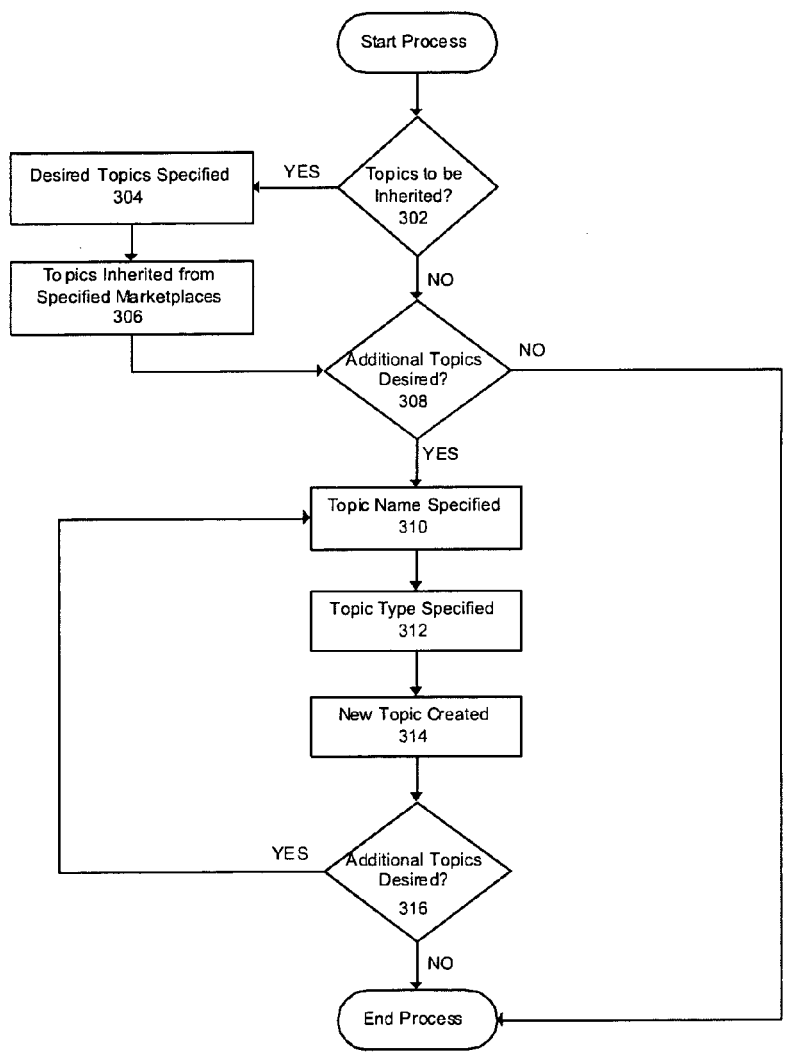
FIG. 3 illustrates an exemplary process flow for creating user-defined listing topics.

An exemplary manner and method of defining the listing topics discussed in connection with step 238 is illustrated by exemplary process flow 300 in FIG. 3. Process flow 300 may be implemented within information application 108, information database 114, information platform 102, and/or other appropriate portions of system 100, as will be known to those skilled in the art. At step 302, a user 132 is prompted to specify whether he/she desires to inherit listing topics defined within pre-existing marketplaces into the new user-defined marketplace 122 (i.e., whether user 132 desires to have the same listing topics appear in the new user-defined marketplace as appear in pre-existing marketplaces).

If user 132 indicates a desire to inherit listing topics at step 302, then at step 304 user 132 specifies the listing topics that are to be inherited to the newly-created user-defined marketplace 122. At step 304 user 132 may specify one or more or all of the listing topics contained within one or more previously-defined marketplaces. User 132 may specify these listing topics in any number of ways known to those of skill in the art, including, for example, by entering the desired listing topics into fields displayed on a webpage hosted by server 106 using a keyboard or by selecting listing topics from a drop-down menu using a mouse connected to access device 110 in communication with information application 108.

In many embodiments, at step 304 user 132 is presented with an option to select from the listing topics defined within the categorical classification 124 that was selected at step 218, the geographic classification 126 that was specified at 222, and/or the related marketplaces that were selected in step 234. After user 132 has specified the listing topics to be inherited, at step 306 these listing topics are inherited and created within the new user-defined marketplace 122. For example, a user 132 who has created the user-defined marketplace "Dallas First Baptist Church" may decide to inherit each of the listing topics defined within the linked marketplace "Methodist Church of Dallas". Thus, if the "Methodist Church of Dallas" marketplace contains the listing topics "Religious Discussion", "Items for Sale" and "Service Opportunities", these listing topics will be automatically created within the "Dallas First Baptist Church" marketplace.

Alternative to the manual selection process described above in connection with steps 302, 304 and 306, each of the listing topics contained in the categorical classification 124 that was selected at step 218, the geographic classification 126 that was specified at 222, and/or the related marketplaces that were selected in step 234 may be automatically inherited by the new user-defined marketplace 122 through an operation performed within information application 108.

Once the specified listing topics have been inherited at step 306, or if a user 132 has specified at step 302 that no listing topics are to be inherited, then control proceeds to step 308 where user 132 is prompted to specify whether he/she desires to create additional listing topics within the newly-created user-defined marketplace 122. If user 132 specifies a desire to create additional listing topics, then control proceeds to step 310; otherwise exemplary process flow 300 terminates. At step 310, user 132 is prompted to specify the name of the listing topic to be created. Generally speaking, the name chosen by user 132 may be descriptive of the types of listings to be posted thereunder.

At step 312, user 132 may be prompted to specify the type of listing topic that is desired to be created. In general, listing topics may be classified into two broad types: marketplace topics and discussion forum topics. Marketplace topics generally refer to topics in which items and/or services may be offered, requested, provided, obtained, shared, and/or exchanged. For example, a user 132 interested in facilitating the exchange of used religious books within the user-defined marketplace "Dallas First Baptist Church" might create a marketplace topic named "Religious Books for Sale". In contrast, discussion forum topics generally refer to topics in which information is exchanged, topics are discussed, and messages are posted. For example, a user 132 interested in discussing ways to improve photography skills might create a discussion forum topic named "Photography Tips and Experiences" within the user-defined marketplace "Greater Boston Amateur Photographers Association".

Once user 132 has specified whether the listing topic is to be a marketplace topic or a discussion forum topic, control proceeds to step 314 where the new listing topic having the specified attributes is created. At step 316, user 132 is prompted to specify whether he/she desires to create additional listing topics. If yes, control returns to step 310; otherwise exemplary process flow 300 terminates.

Returning to FIG. 2B, at step 240 user 132 is prompted to specify the level of administrative control user 132 desires to exercise over the new user-defined marketplace 122, such as whether and how other users 132 may post or view listings 118 within the new user-defined marketplace 122, and/or whether and how other users 132 may gain access to the contact information attributes contained in listings 118 posted within the new user-defined marketplace 122 (collectively, "access rights"). An exemplary manner and method for determining whether a user 132 may gain access to contact information attributes contained in listings 118 will be described in greater detail below in connection with exemplary process flow 600 illustrated in FIG. 6.

Access rights may be specified by user 132 in any number of ways and combinations. For example, user 132 may decide to limit the right to post and/or view listings 118 or to gain access to the contact information attributes of listings 118 within new user-defined marketplace 122 to registered members of the new user-defined marketplace 122 and/or to registered members of linked marketplaces ("limited access rights"). User 132 may also decide to permit all users 132 of information platform 102 to post or view listings 118 and/or gain access to the contact information attributes of listings 118 within the new user-defined marketplace 122 ("open access rights"). Access rights could also be used to affect pricing (e.g., reduced pricing for discussion groups), to set additional features (e.g., threaded postings) or to make certain features inapplicable (e.g., no contact information). Upon specifying the access rights for user-defined marketplace 122, exemplary process flow 200 terminates.

In possible embodiments user 132 may be required to pay a fee to system administrators of information platform 102 or the creator/administrator of a pre-existing user-defined marketplace 122 in exchange for the creation of a new user-defined marketplace. For example, as with the fees that may be paid in exchange for the creation of listings 118 (described in greater detail above), user 132 may pay a flat periodic fee (e.g., a fee paid weekly, monthly or annually), a classification-based fee (e.g., a fee that increases as the number of classifications with which user-defined marketplace 122 is associated increases), or a per-hit fee (e.g., a fee that is incurred every time a user 132 accesses user-defined marketplace 122) for the creation and storage of a user-defined marketplace 122. In many embodiments, the type of fee that a user 132 is required to pay for the creation or maintenance of a user-defined marketplace 122 is stored as a fee-type attribute in user-defined marketplace 122. Fee-types are discussed in more detail in U.S. patent application Ser. No. 10/680,952.

As detailed above, exemplary process flow 200 enables users 132 to create marketplaces having a reach and scope that is specifically tailored to their particular domain of interest. In particular, by allowing users 132 to create their own geographic classifications, many of which may be more local or specific than traditional administrator-defined geographic classifications, exemplary process flow 200 enables a user 132 to create marketplaces that more closely align with a user's desired scope and reach. Exemplary process flow 200 thus facilitates the exchange of information, items and services that were previously impractical within conventional classified systems.

In addition, classifying user-defined marketplaces 122 under administrator-defined categorical classifications 124 and other preexisting user-defined marketplaces enables each user-defined marketplace 122 to be organized and classified within the conventional taxonomic classification system detailed above, thereby facilitating the seamless integration of each new user-defined marketplace 122 into listing classification data 116. Moreover, by allowing creators or administrators of user-defined marketplaces 122 to set access rights based on whether a user is a registered member of a marketplace or a linked marketplace, the exposure, reach and privacy of each user-defined marketplace can be more specifically tailored to meet the needs of each marketplace.

III. Creation of Listings

Figure 4:
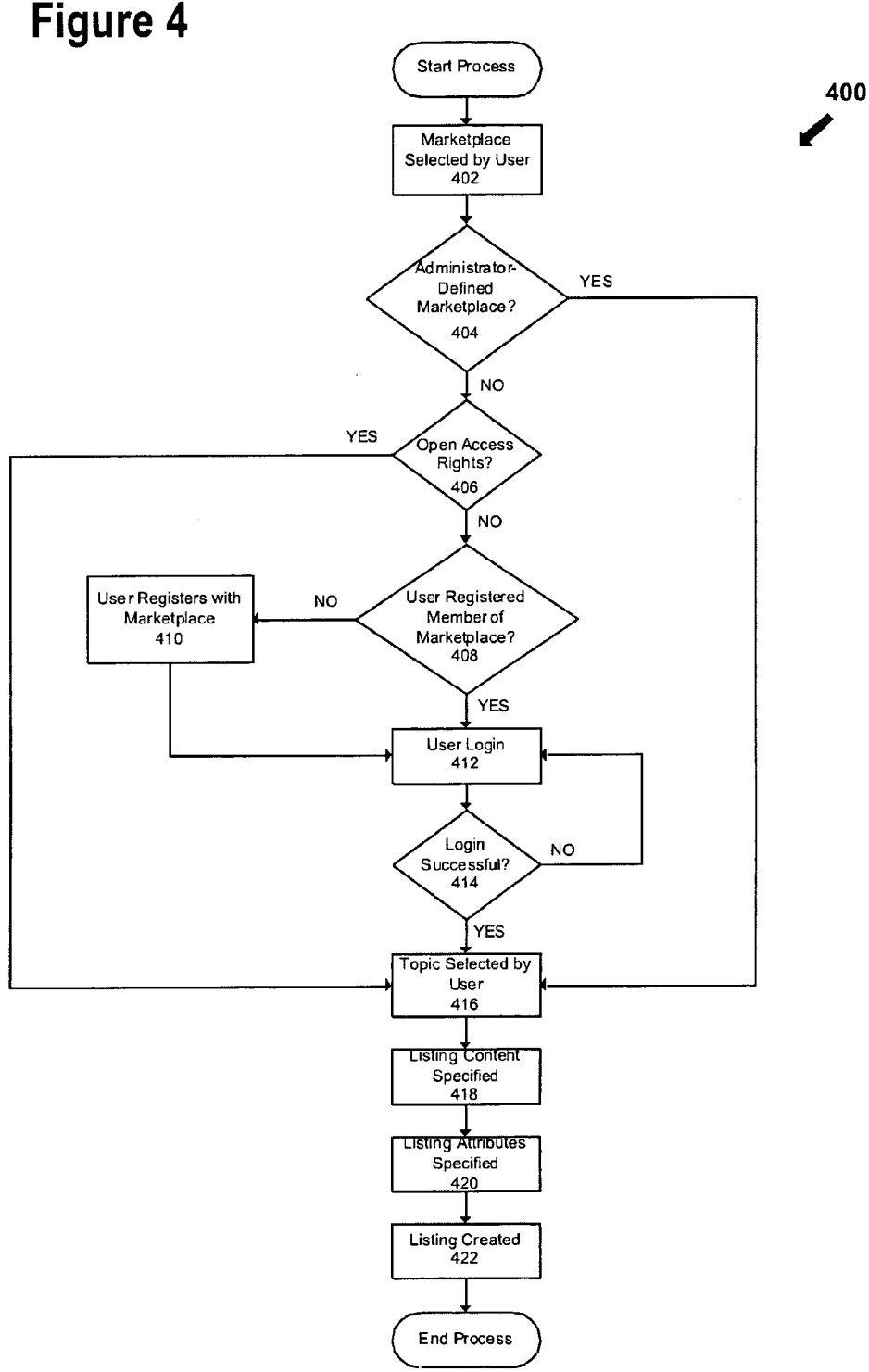
FIG. 4 illustrates an exemplary process flow for creating classified listings.

An exemplary process flow 400 for creating and posting listings 118 within marketplaces in information platform 102 is illustrated in FIG. 4. Exemplary process flow 400 may be implemented in information application 108, information database 114, and/or other portions of system 100. In many embodiments, user 132 creates and posts listings 118 by interacting with various aspects of information platform 102 via access device 110.

At step 402, user 132 selects the marketplace under which the new listing 118 is to be classified. Generally speaking, user 132 may either select an administrator-defined marketplace 120 (such as a categorical classification 124 or a geographic classification 126) or a user-defined marketplace 122. For example, a user 132 living in the Boston area and interested in listing the sale of a camera might select the user-defined marketplace "Greater Boston Amateur Photographers Association", or the administrator-defined geographic classification "Greater Boston Area". User 132 may select the desired marketplace at step 402 in any number of ways known to those of skill in the art, including, for example, by entering some or all of the name of the desired marketplace into fields displayed on a webpage hosted by server 106 using a keyboard (e.g., to perform a search for one or more matching marketplace(s)) or by selecting the desired marketplace from a drop-down menu using a mouse connected to access device 110 in communication with information application 108.

Once user 132 has selected the marketplace under which listing 118 is to be posted, then at step 404 it is determined whether the selected marketplace is a user-defined marketplace 122 or an administrator defined marketplace 120. If the selected marketplace is a user-defined marketplace 122, control proceeds to step 406; otherwise control proceeds to step 416.

At step 406, it is determined whether the selected user-defined marketplace 122 has open access rights or limited access rights, as those terms have been described in connection with step 240 in FIG. 2B. As detailed above, creators/administrators may restrict access to user-defined marketplaces 122 based on whether a user 132 is a registered member of the marketplace or a registered member of a linked marketplace. If at step 406 it is determined that the user-defined marketplace 122 selected by user 132 at step 402 has open access rights, control proceeds to step 416. Otherwise, control proceeds to step 408.

At step 408, user 132 is prompted to specify whether he/she is a registered member of this marketplace or a linked marketplace. In many embodiments, the marketplaces that are linked to the user-defined marketplace 122 selected by user 132 in step 402 are displayed so that user 132 can determine whether he/she is a registered member of any of these linked marketplaces. If at step 408 user 132 specifies that he/she is not a registered member of either the selected marketplace or one of the displayed linked marketplaces, then control proceeds to step 410 where user 132 is prompted to complete a registration process; otherwise control proceeds to step 412. Persons of ordinary skill in the art will understand that the registration process of step 410 can occur in any number of ways, including by prompting user 132 to enter various information or personally-identifiable indicia via access device 110, such as a name, address, email address, telephone number, etc. The registration process in step 410 may also entail requiring user 132 to define a username and/or password. Upon successful registration at step 410, the username and/or password defined by user 132 may be assigned to the user by information application 108.

At step 412, user 132 may be prompted to enter login information relevant to the marketplace with which user 132 is registered. Upon entry of the requested login information, at step 414 it is determined whether the login information entered by user 132 matches registration records contained within information platform 102. If the login information provided by user 132 matches registration records contained within information platform 102, then control proceeds to step 416. Otherwise, control returns to step 412 where user 132 is again prompted to enter login information.

Once user 132 has successfully logged in, at step 416 user 132 is prompted to select a listing topic under which the new listing 118 is to be posted. For example, a user 132 living in the Ballston community of Arlington, Va. and interested in posting a listing 118 advertising the sale of a used children's bicycle might select the previously-defined listing topic "Items For Sale" defined within the user-defined marketplace "Ballston Community".

Once user 132 has selected the desired listing topic, then at step 418 user 132 is prompted to specify the listing content data 130 to be included in the new listing 118. As detailed above, listing content data 130 refers to information about the item, service, announcement, message or need that user 132 desires to be listed in listing 118. For example, listing content data 130 might contain a detailed description or pictures of an item for sale, details about a neighborhood barbeque, information about a secretarial job opening, or a message that user 132 desires to communicate to members of an online discussion forum. Listing content data 130 may be specified by user 132 at step 418 in any number of ways known to those of skill in the art, including, for example, by entering a text-based description of the new listing 118 using a keyboard connected to access device 110 and/or by uploading pictures, video or sound clips to information platform 102 from access device 110 via connections 112.

Once user 132 has specified the listing content data 130 to be included in listing 118, at step 420 user 132 is prompted to specify one or more listing attributes to be associated with the new listing 118. As detailed above, listing attributes generally refer to attributes about a specific listing 118, such as a contact information attribute, a geographic attribute, a classification attribute and/or a fee-type attribute, as those terms have been previously defined. In many embodiments, the listing attributes specified by user 132 are stored within listing attribute data 128.

Although user 132 may enter one or more of all of these listing attributes at step 420, in many embodiments user 132 is only prompted to specify the contact information attributes to be associated with the new listing 118, such as the user's telephone number, email address or physical address. According to this embodiment, the remaining data stored in listing attribute data 128 are either assigned by administrators of information platform 102 or are determined automatically based on information previously entered by user 132. For example, the classification attribute for the new listing 118 may be determined automatically based on the marketplace selected by user 132 in step 404, the geographic attribute may be determined automatically based on the user's physical address provided during registration, and/or the fee-type attribute to be associated with the new listing 118 may be assigned by system administrators of information platform 102. Alternatively, at step 420 user 132 may be prompted to specify each of the listing attributes to be associated with the new listing 118.

Once user 132 has specified the desired listing attributes at step 420, then at step 422 the new listing 118 is created and stored within information platform 102. As detailed above, in many embodiments listings 118 are stored within information database 114. Upon the creation of the new listing 118 at step 422, control of exemplary process flow 400 terminates.

In some cases user 132 may be required to pay a fee to creators/administrators of the marketplace selected at step 402 in exchange for creating and classifying a new listing 118 under this marketplace or to maintain a listing. For instance, as with the fees that may be paid in exchange for the creation of a new user-defined marketplace 122 (described in greater detail above), user 132 may pay a flat periodic fee (e.g., a fee paid weekly, monthly or annually), a classification-based fee (e.g., a fee that increases as the number of classifications with which user-defined marketplace 122 is associated increases), or a per-hit fee (e.g., a fee that is incurred every time a user 132 accesses user-defined marketplace 122) to creators/administrators of the selected marketplace in exchange for creating and classifying or maintaining a listing 118 under the selected marketplace. Fee-types are discussed in more detail in U.S. patent application Ser. No. 10/680,952.

For example, if at step 402 user 132 selects an administrator-defined marketplace, system administrators of information platform 102 may require user 132 to pay a specified fee in exchange for creating and classifying a new listing 118 under this administrator-defined marketplace. Alternatively, if at step 402 user 132 selects a user-defined marketplace 122, creators/administrators of the selected user-defined marketplace may require user 132 to pay a specified fee in exchange for creating and classifying a new listing 118 under this user-defined marketplace. In many embodiments, creators/administrators of user-defined marketplaces 122 may also be required to share a portion of the fees they collect from users 132 with system administrators of information platform 102.

IV. Exemplary User Search Flows

Figure 5:
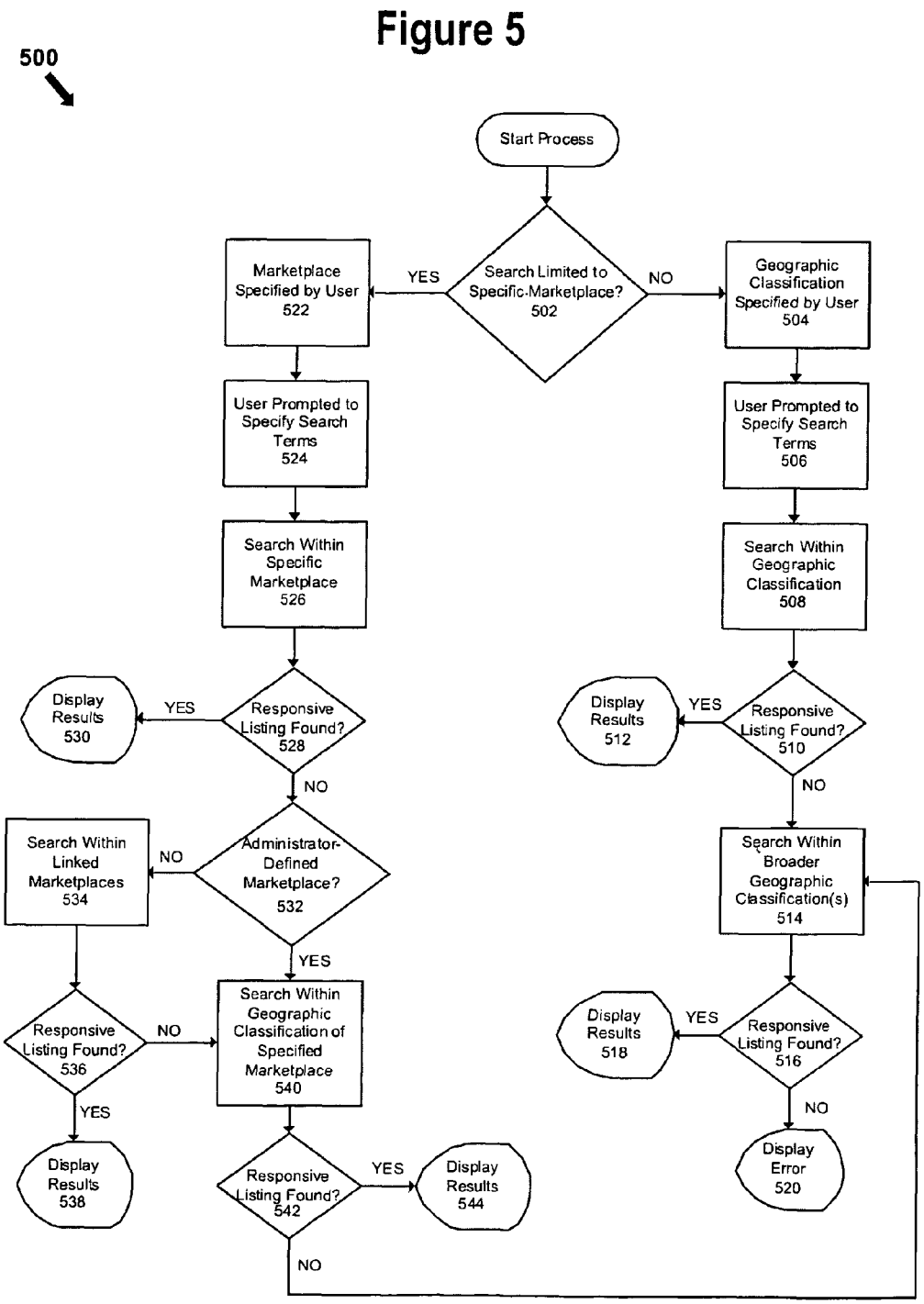
FIG. 5 illustrates an exemplary process flow for enabling users to search for listings posted in marketplaces stored in an information platform.
Figure 6:
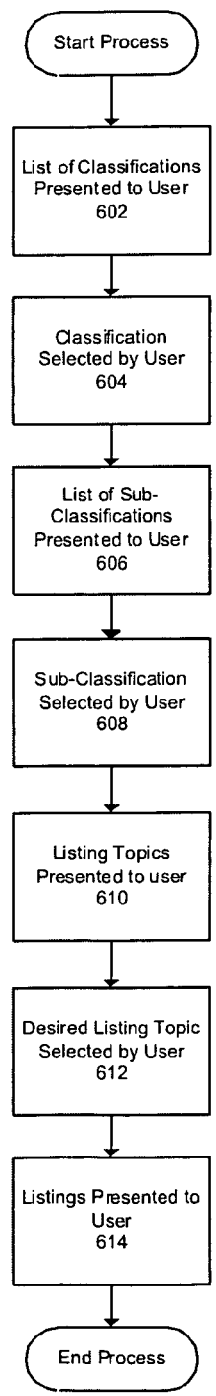
FIG. 6 illustrates an exemplary process flow for enabling users to browse for and locate listings by interacting with a webpage hosted by a server.

An exemplary process flow 500 for enabling users 132 to search for listings 118 classified within marketplaces stored in information platform 102 is illustrated in FIG. 5. An alternative exemplary process flow 600 for enabling users 132 to browse for and locate listings 118 by interacting with a webpage hosted by a server such as server 106 is illustrated in FIG. 6. Exemplary process flows 500 and 600 may be implemented in information application 108, information database 114, and/or other portions of system 100. In many embodiments, user 132 searches or browses for listings 118 by interacting with various aspects of information platform 102 via access device 110.

Beginning with exemplary process flow 500, at step 502 user 132 is prompted to specify whether he/she desires to search for listings 118 within a specific marketplace. If user 132 specifies a desire to search for listings 118 within a specific marketplace, control proceeds to step 522. Otherwise, control proceeds to step 504 where user 132 is prompted to specify a desired geographic classification 126 to be searched.

At step 504, user 132 may specify the desired geographic classification 126 to be searched in any number of ways known to those of skill in the art, including, for example, by entering the desired geographic classification 126 into fields displayed on a webpage hosted by server 106 using a keyboard connected to access device 110 in communication with information application 108. Alternatively, if the name of the desired geographical classification 126 is unknown to user 132, user 132 may select a geographic classification 126 to be searched from a drop-down menu displayed on a webpage hosted by server 106 using a mouse connected to access device 110 in communication with information application 108.

Once user 132 has specified the geographic classification 126 to be searched, then at step 506 user 132 is prompted to specify one or more search terms relevant to the item, service, message, etc. that user 132 desires to locate. For example, a user 132 living in the metro area of Atlanta, Ga. and interested in purchasing a used motorcycle might, after specifying the geographic classification 126 "Metro Atlanta" in step 504, enter the search terms "motorcycle" and "used".

At step 508, a search operation is performed to determine whether any listings 118 classified within marketplaces associated with the geographic classification 126 specified by user 132 at step 504 are responsive to the search terms entered by user 132 in step 506. Listings 118 may be determined to be responsive to the search terms entered by user 132 in any number of ways, including, for example, by comparing the search terms entered by user 132 in step 506 with listing content data 130 stored within each listings 118 classified under the geographic classification 126 specified by user 132 at step 504 to determine whether any of the search terms entered by user 132 match terms stored within this listing content data 130. Generally speaking, the search operation performed at step 508 is a process executed within information platform 102, such as by information application 108 provided by server 106.

If at step 510 it is determined that one or more listings 118 classified within the marketplaces associated with the specified geographic classification 126 are responsive to one or more of the search terms entered by user 132 in step 506, control proceeds to step 512 where the responsive listings 118 are transmitted to and displayed on access device 110. Otherwise, control proceeds to step 514.

The order in which responsive listings 118 are displayed on access device 110 may be based on any number of factors or placement heuristics, including, for example, the number of matching terms contained within these listings 118 ("relevancy attribute"), the priorities assigned to these listings 118 by system administrators of information platform 102 ("position adjustment attribute"), and/or the fee-type attribute associate with these listings 118. For example, responsive listings 118 having a higher number of matching terms, a higher position adjustment attribute, or a higher priority fee-type attribute may be displayed on access device 110 prior to other responsive listings 118. In many embodiments, position adjustment attributes are stored within listing attribute data 128. A detailed description and explanation of these and an additional number of methods used to organize responsive listings may be found in U.S. patent application Ser. No. 10/948,425 and U.S. patent application Ser. No. 10/680,952.

If, however, at step 510 it is determined that none of the listings 118 classified within the marketplaces associated with the geographic classification 126 specified by user 132 at step 514 are responsive to one or more of the search terms entered by user 132 at step 506, then at step 514 a subsequent search operation is performed to determine whether any listings 118 classified under marketplaces associated with a geographical classification 126 that is broader in scope than the geographic classification 126 originally specified by user 132 at step 504 are responsive to the search terms entered by user 132. In many embodiments, the broader geographic classification 126 of step 514 is just slightly broader in scope than the geographic classification 126 specified by user 132 at step 504. For example, in the example where a user 132 living in Atlanta, Ga. desires to locate listings detailing used motorcycles for sale, if at step 510 it is determined that no responsive listings 118 are classified within marketplaces associated with the geographic classification "Metro Atlanta", then at step 514 a search operation may be performed to determine whether responsive listings 118 are classified within marketplaces associated with the geographic classification "North Georgia".

If at step 516 it is determined that one or more listings 118 classified within marketplaces associated with the broader geographic classification 126 are responsive to one or more of the search terms entered by user 132 in step 506, control proceeds to step 518 where the responsive listings 118 are transmitted to and displayed on access device 110. Otherwise, control proceeds to step 520 where an error message is transmitted to and displayed on access device 110 indicating that no listings responsive to the user's search terms were located.

Although not illustrated in FIG. 5, one or more subsequent search operations may be performed prior to step 520 to determine whether responsive listings 118 are classified under marketplaces that are associated with one or more progressively broader geographic classifications 126. Persons of skill in the art will recognize, however, that the potential relevancy of any such listing 118 located within marketplaces associated with any of these progressively broader geographic classifications 126 is likely to decrease generally proportionate to the increased scope of the broader geographic classifications 126.

Returning to step 502, if user 132 specifies a desire to search within a specific marketplace, then at step 522 user 132 is prompted to specify the desired marketplace to be searched. Generally speaking, user 132 may specify either a user-defined marketplace 122 or an administrator-defined marketplace 120 (such as a categorical classification 124). User 132 may specify the desired marketplace to be searched in any number of ways known to those of skill in the art. For example, if the specific name of the desired marketplace is known to user 132, user 132 may enter the name of the desired marketplace into a field displayed on a webpage hosted by server 106 using a keyboard connected to access device 110 in communication with information application 108.

User 132 may learn of the names of user-defined marketplaces 122 in any number of ways, including, for example, through the creators/administrators of the marketplace. For example, the minister of the Dallas First Baptist Church might inform members of the church's congregation that a user-defined marketplace named "Dallas First Baptist Church" has been created. Alternatively, if the name of the desired marketplace is unknown to user 132, user 132 may select a marketplace to be searched from a drop-down or hierarchal menu displayed on a webpage hosted by server 106 using a mouse connected to access device 110 in communication with information application 108.

Once user 132 has specified the name of the marketplace to be searched, then at step 524 user 132 is prompted to specify one or more search terms relevant to the item, service, message, etc. that user 132 desires to locate. For example, a user 132 living in the Boston area and interested in purchasing a digital camera might, after selecting the user-defined marketplace "Greater Boston Amateur Photographers Association" at step 522, enter the search terms "digital" and "camera".

Upon entering the desired search terms, at step 526 a search operation is performed to determine whether any of the listings 118 classified within the specified marketplace are responsive to the search terms entered by user 132. If at step 528 it is determined that one or more listings 118 classified within the specified marketplace are responsive to one or more of the search terms entered by user 132 in step 524, control proceeds to step 530 where the responsive listings 118 are transmitted to and displayed on access device 110.

If, however, at step 528 it is determined that none of the listings 118 classified within the marketplace specified by user 132 at step 522 are responsive to one or more of the search terms entered by user 132 at step 524, then at step 532 it is determined whether the marketplace specified by user 132 at step 522 is an administrator-defined marketplace 120 or a user-defined marketplace 122. If the marketplace specified by user 132 at step 522 is an administrator-defined marketplace 120, control proceeds to step 540. Otherwise, control proceeds to step 534.

At step 534, a subsequent search operation is performed to determine whether any listings 118 classified under any of the marketplaces linked to the user-defined marketplace 122 specified by user 132 in step 522 are responsive to the search terms entered by user 132. For example, in the example where a user 132 living in the Boston area desires to locate listings detailing digital cameras for sale, if at step 528 it is determined that no responsive listings 118 are classified within the user-defined marketplace "Greater Boston Amateur Photographers Association", then at step 534 a subsequent search operation may be performed to determine whether responsive listings 118 are classified within the linked marketplaces "Professional Photography Association of Boston" and "Nature Photography Enthusiasts of Boston". If there are no marketplaces linked to the user-defined marketplace 122 specified by user 132 at step 522, then steps 534 and 536 are skipped and control proceeds to step 540.

If at step 536 it is determined that one or more listings 118 classified within one or more of the linked marketplaces are responsive to one or more of the search terms entered by user 132 in step 524, control proceeds to step 538 where the responsive listings 118 are transmitted to and displayed on access device 110. Otherwise, control proceeds to step 540.

At step 540, a subsequent search operation is performed to determine whether any of the listings 118 classified under the geographical classification 126 associated with the marketplace specified by user 132 at step 522 are responsive to the search terms entered by user 132 (as detailed above in connection with FIGS. 2A and 2B, marketplaces may be associated with geographic classifications 126). For example, in the example where a user 132 living in the Boston area interested in purchasing a digital camera has specified the user-defined marketplace "Greater Boston Amateur Photographers Association" at step 522, then if no responsive listings 118 are located at step 528 or step 536, then a subsequent search operation may be performed at step 540 to determine whether responsive listings 118 are classified within the geographic classification "Greater Boston area".

If at step 542 it is determined that one or more listings 118 classified within the geographic classification 126 associated with the marketplace specified by user 132 are responsive to one or more of the search terms entered by user 132 in step 524, control proceeds to step 544 where the responsive listings 118 are transmitted to and displayed on access device 110. Otherwise, control proceeds to step 514 where a subsequent search is performed to determine whether any of the listings 118 classified under a geographical classification 126 that is broader in scope than the geographic classification 126 of step 542 are responsive to the search terms entered by user 132. Control of exemplary process flow 500 then proceeds through steps 516, 518 and 520 in the manner previously described.

Exemplary process flow 500 thus enables users 132 to locate listings 118 relevant to their needs in a variety of ways. For example, by adaptively expanding beyond the scope of the marketplace or classification initially specified by user 132, exemplary process flow 500 enables user 132 to locate potentially relevant listings 118 that are just beyond the scope of the specified marketplace or classification. In addition, by expanding the search for responsive listings 118 from the marketplace specified by user 132 to linked marketplaces (if applicable) followed by broadened geographic classifications 126, responsive listings 118 that are more closely related to the search criteria entered by user 132 will be located and displayed to user 132 prior to those listings 118 that are less related. Exemplary process flow 500 thus realizes improvements in searching efficiency and relevancy of returned results.

Exemplary process flow 600, illustrated in FIG. 6, provides an alternative to exemplary process flow 500. As detailed above, in certain embodiments each marketplace and classification in information platform 102 is classified or categorized in a hierarchal or taxonomical manner. For example, the categorical classification "Health Care Jobs" might be classified as a species within the genus of the categorical classification "Employment Opportunities", while the geographic classification "Metro Atlanta" might be classified under the geographic classification of "North Georgia", and so on. Thus, as an alternative to exemplary process flow 500, exemplary process flow 600 enables users 132 to browse for and locate listings 118 by interacting with a webpage hosted by server 106 to navigate through the hierarchal or taxonomical relationship between these marketplaces or classifications.

At step 602, a listing of select classifications stored within information database 114 (such as categorical classifications 124 or geographic classifications 126) is presented to user 132 on access device 110. In many embodiments, the select classifications to be presented to user 132 are pre-selected by system administrators of information platform 102. For example, system administrators might desire to present a select number of broad categorical classifications 124 to user 132, such as "Help Wanted", "Personal Ads", or "Items For Sale". System administrators might also desire to present a select number of broad geographic classifications 126 to user 132, such as "San Francisco, Calif.", "Georgia", or "Dallas, Tex.". The listing of select classifications may be presented to user 132 in any number of ways known to those of skill in the art, such as by displaying the listing of select classifications as a webpage on access device 110.

At step 604, user 132 is prompted to select a classification to browse within from the list of select classifications presented on access device 110. User 132 may select the desired classification in any number of ways known to those of skill in the art, including, for example, by using a mouse connected to access device 110 in communication with information application 108. Once user 132 has selected a classification to browse within from the list of select classifications, at step 606 user 132 may be presented with a list of the sub-classifications (such as user-defined marketplaces 122) classified under the classification selected by user 132 at step 604. In many embodiments, these sub-classifications are displayed as a webpage on access device 110.

At step 608, user 132 is prompted to select a sub-classification to browse within from the list of sub-classifications presented on access device 110. User 132 may select the desired sub-classification in any number of ways known to those of skill in the art, including, for example, by selecting the desired sub-classification using a mouse connected to access device 110 in communication with information application 108.

Once user 132 has selected a sub-classification to browse within from the list of sub-classifications, at step 610 user 132 may be presented with a list of the listing topics contained in this sub-classification. In many embodiments, this list of listing topics is displayed as a webpage on access device 110. At step 612, user 132 is then prompted to select a listing topic to browse within from the list of listing topics contained in the selected sub-classification. User 132 may select the desired listing topic in any number of ways known to those of skill in the art, including, for example, by using a mouse connected to access device 110 in communication with information application 108.

Once user 132 has selected the desired listing topic at step 612, then at step 614 a listing of each of the listings 118 classified under the selected listing topic may be presented to user 132 on access device 110. In many embodiments, the listings 118 classified under the selected listing topic are displayed as a webpage on access device 110. Control of exemplary process flow 600 then terminates.

For example, a user 132 living in the Boston area and interested in purchasing a digital camera might select the geographic classification "Greater Boston Area" at step 604 from an initial listing of classifications displayed on a webpage hosted by server 106 at step 602. At step 608, user 132 may then select the user-defined marketplace "Greater Boston Amateur Photographers Association" from a listing of sub-classifications classified under the geographic classification "Greater Boston Area" displayed on access device 110 at step 606. User 132 may then select the listing topic "Digital Cameras For Sale" at step 612 from a listing of the listing topics contained within this user-defined marketplace and displayed on access device 110 at step 610. Each of the listings 118 classified under the listing topic "Digital Cameras For Sale" may then be displayed on access device 110.

Thus, in certain embodiments, user 132 may locate listings 118 by browsing through or exploring the hierarchal or taxonomical relationships between the marketplaces and classifications in information platform 102 by interacting with a webpage hosted by server 106 using a mouse connected to access device 110. Allowing user 132 to locate listings 118 in this manner provides greater flexibility to information platform 102 and enables users 132 to locate listings 118 closely related to a specific field of interest without requiring the use of precise search terms. Ease of use of information platform 102 is thus increased, thereby leading to potential increases in market exposure for listings 118 and a potential increase in the number of realized transactions.

As an alternative to requiring user 132 to select a marketplace or geographic classification to search or browse within in exemplary process flows 500 and 600, user 132 may search for listings 118 stored in information platform 102 merely by specifying one or more search terms relevant to the item, service, message, etc. that user 132 desires to locate. In many embodiments, user 132 is simply prompted to enter one or more search terms into a search box displayed on a webpage hosted by a server, such as server 106. For example, a user 132 living in the metro area of Atlanta, Ga. and interested in purchasing a used motorcycle might enter the search terms "motorcycle", "used" and "Atlanta" into a search box displayed on a webpage hosted by server 106 by using an input device, such as a keyboard, connected to access device 110.

Once user 132 has entered the desired search terms, a search operation similar to that described in connection with step 508 in FIG. 5 is performed to determine whether any of the listings 118 stored within information database 114 are responsive to the search terms entered by user 132. As described above, listings 118 may be determined to be responsive to the search terms entered by user 132 in any number of ways, including, for example, by comparing the search terms entered by user 132 with the listing attribute data 128 (such as the geographic attributes or classification attributes) or listing content data 130 stored within each of the listings 118 in information database 114 to determine whether any of the search terms entered by user 132 match terms stored within this listing attribute data 128 or listing content data 130. Generally speaking, this search operation is a process executed within information platform 102, such as by information application 108 provided by server 106.

If one or more listings 118 stored within information database 114 are determined to be responsive to one or more of the search terms entered by user 132, the responsive listings 118 are transmitted to and displayed on access device 110. In many embodiments, these responsive listings 118 are ordered in accordance with their relevancy attributes, position adjustment attributes, and/or their fee-type attributes (as those terms have been previously-defined) prior to their being displayed on access device 110.

Thus, by permitting user 132 to search for relevant listings 118 based solely on one or more search terms, users are able to locate potentially relevant listings without having to limit their search to a specific marketplace or geographic classification. Ease of use of system 100 is thereby increased and the complexity associated user search flows is reduced.

V. Accessing Contact Information Attributes

Figure 7:
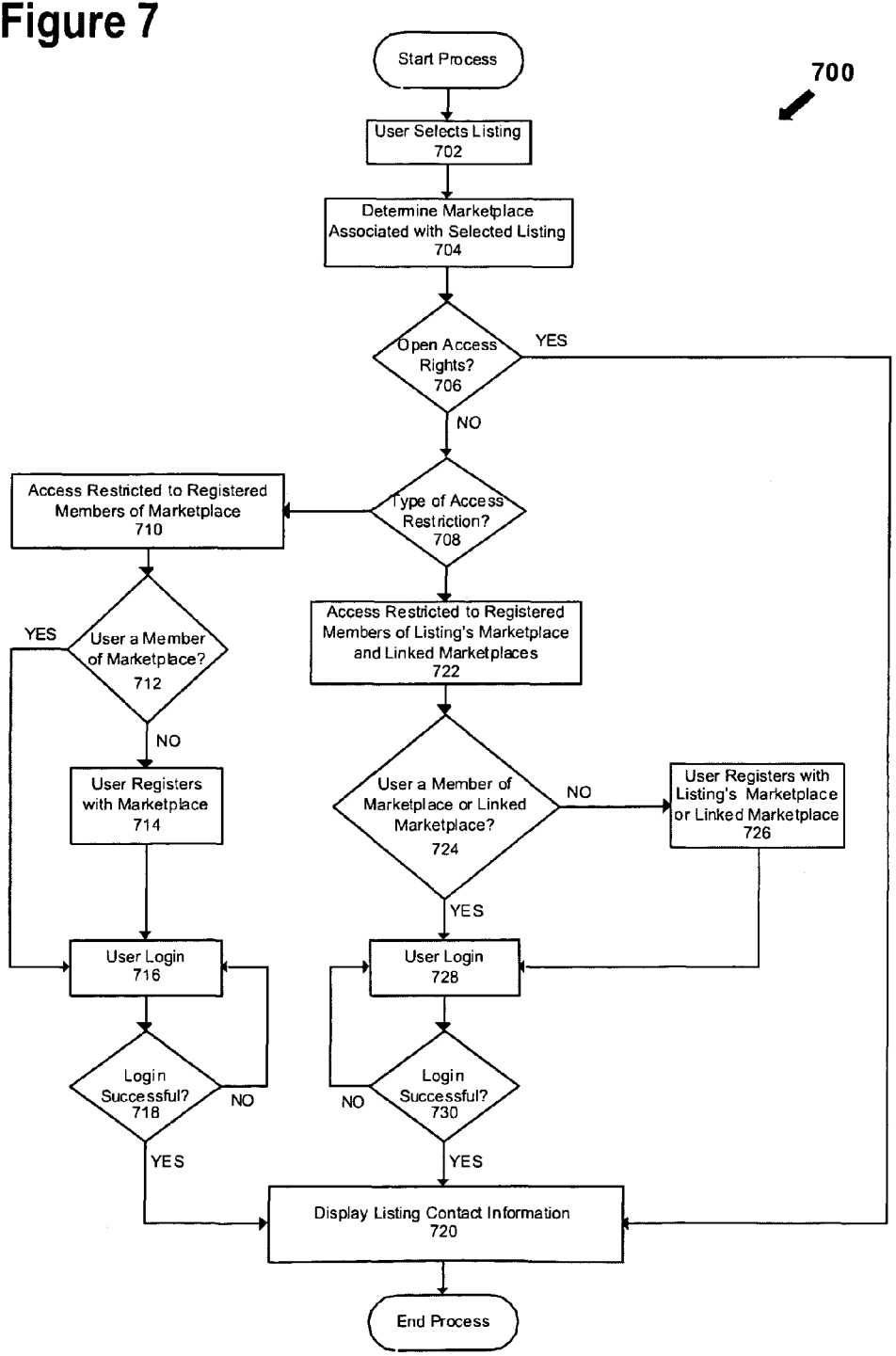
FIG. 7 illustrates an exemplary process flow for determining when users may access contact information attributes associated with classified listings in user-defined marketplaces.

As detailed above, in certain embodiments user 132 may decide to restrict access to the contact information attributes of listings 118 within user-defined marketplaces 122 based on whether a subsequent user 132 is a registered member of the user-defined marketplace 122 or a registered member of a linked marketplace. An exemplary process flow 700 for determining when users 132 may access the contact information attributes associated with listings 118 in user-defined marketplaces 122 is illustrated in FIG. 7. Exemplary process flow 700 may be implemented in information application 108, information database 114, and/or other portions of system 100. In many embodiments, user 132 accesses the contact information attributes associated with listings 118 by interacting with various aspects of information platform 102 via access device 110.

As explained earlier in connection with exemplary process flows 500 and 600, users 132 may locate listings 118 relevant to their needs in a variety of ways. Once a relevant listing 118 has been located, at step 702 user 132 may select this listing 118 in a number of ways well known to those of skill in the art, including through use of access device 110 in communication with information platform 102. At step 704, the marketplace (administrator-defined or user-defined) under which the listing 118 selected by user 132 is classified is determined. In many embodiments, the marketplace under which listing 118 is classified is stored as a classification attribute in listing attribute data 128.

Once the marketplace under which the listing 118 selected by user 132 is determined, at step 706 it is determined whether users 132 of information platform 102 have been given open access to this marketplace. If so, control proceeds to step 720 where the contact information attributes associated with the selected listing 118 are displayed on access device 110. Otherwise, control proceeds to step 708.

At step 708, the type of access restriction that has been placed on the selected listing 118 is determined. If access to the contact information attributes associated with the selected listing 118 is only granted to registered members of the listing's marketplace, control proceeds to step 710. If, however, access to the contact information attributes associated with the selected listing 118 is granted to registered members of the listing's marketplace and to registered members of marketplaces that have been linked to the listing's marketplace, then control proceeds to step 722.

If access is restricted to members of the listing's marketplace, control proceeds through 710 to step 712. At step 712, user 132 is prompted to specify whether he/she is a registered member of the marketplace associated with the selected listing 118. If user 132 specifies that he/she is a registered user of this marketplace, control proceeds to step 716 where user 132 may be prompted to enter the login information user 132 received upon registration with the marketplace.

If at step 712 user 132 specifies that he/she is not a registered member of the marketplace associated with the selected listing, then control proceeds to step 714 where user 132 is prompted to complete a registration process. As detailed above, persons of ordinary skill in the art will understand that the registration process of step 714 can occur in any number of ways, including by prompting user 132 to define a username and/or password. Upon successful registration at step 714, the username and/or password defined by user 132 may be assigned to user 132 by information application 108.

At step 716, user 132 is prompted to enter the login information provided to user 132 upon registration with the marketplace associated with the selected listing. Upon entry of the requested login information, at step 718 it is determined whether the login information entered by user 132 matches registration records contained within information platform 102. If the login information provided by user 132 matches registration records contained within information platform 102, then control proceeds to step 720. Otherwise, control returns to step 716 where user 132 is again prompted to enter login information.

Returning to step 708, if access to the contact information attributes associated with the selected listing 118 is granted to registered members of the listing's marketplace and to registered members of marketplaces that have been linked to the listing's marketplace, control proceeds through step 722 to step 724. At step 724, user 132 is prompted to specify whether he/she is a registered member of the selected listing's marketplace or a linked marketplace. If user 132 specifies that he/she is a registered user of the selected listing's marketplace or a linked marketplace, control proceeds to step 728 where user 132 may be prompted to enter the login information user 132 received upon registration with the specified marketplace. Otherwise, control proceeds to step 726.

At step 726, user 132 is prompted to complete a registration process with either the selected listing's marketplace or a linked marketplace in much the same manner as detailed in connection with step 714. Upon successful registration at step 726, at step 728 user 132 is prompted to enter the login information provided to user 132 upon registration with the marketplace. Upon entry of the requested login information, at step 730 it is determined whether the login information entered by user 132 matches registration records contained within information platform 102. If the login information provided by user 132 matches registration records contained within information platform 102, then control proceeds to step 720. Otherwise, control returns to step 728 where user 132 is again prompted to enter login information.

At step 720, the contact information attributes associated with the listing 118 selected by user 132 in step 702 are transmitted to and displayed on access device 110. In many embodiments, these contact information attributes include the address, phone number or email address of the user who created listing 118. User 132 may then contact the user who created listing 118 using the contact information provided.

By restricting access to the contact information attributes associated with listings 118 to registered members of the listing's marketplace or linked marketplaces, exemplary process flow 700 serves to limit the number of unwanted letter, email and phone solicitations the creator of listing 118 will receive. Thus, although all users 132 of information platform 102 may view the listing content of each listing 118, only users 132 satisfying the access rights criteria established by creators/administrators of the listing's marketplace may access the contact information associated with the listing.

VI. Alternative Embodiments

In accordance with the provisions of the patent statutes, the principles and modes of operation have been explained and illustrated. However, it should be understood that embodiments described herein may be practiced otherwise than is specifically explained and illustrated without departing from the spirit or scope thereof, and that the invention disclosed hereby is intended to be limited only by the following claims.

What is claimed is:

1. A system, comprising:
    a server including an information application, said information application being in communication with an information database, said information database comprising a plurality of marketplaces, each marketplace being associated with a classification, and a plurality of listings respectively classified within said plurality of marketplaces;
    wherein said plurality of marketplaces comprise pre-defined marketplaces and user-defined marketplaces distinct from said pre-defined marketplaces, at least one of said user-defined marketplaces being classified in a classification within at least one of said pre-defined marketplaces; and
    wherein at least one of said user-defined marketplaces is associated with a categorical classification defining at least one listing topic, and at least a subset of said at least one listing topic defined by said categorical classification is inherited and created within said marketplace.

2. The system of claim 1, wherein said information application is selectively accessible by users and said user-defined marketplaces are selectively created by a subset of the users.

3. The system of claim 1, wherein said information database forms at least a portion of a computing device and said information application is a software application executed by said computing device.

4. The system of claim 1, wherein each of said plurality of listings comprises listing attribute data, said listing attribute data comprising at least one of a classification attribute, a geographic attribute, a contact information attribute, a fee-type attribute, and a position adjustment attribute.

5. The system of claim 1, wherein a fee-type attribute is assigned to each of said user-defined marketplaces.

6. The system of claim 1, wherein said plurality of listings and said user-defined marketplaces are created based at least in part on data supplied by an access device in communication with said information application.

7. The system of claim 6, wherein approval from administrators of said system is required prior to creation of at least a subset of said user-defined marketplaces.

8. The system of claim 6, wherein said information application is configured to generate and transmit a response to said access device based upon a request transmitted from said access device, said request comprising at least one search term and said response comprising at least one of said plurality of listings responsive to said request.

9. The system of claim 1, wherein at least one of said user-defined marketplaces is classified within at least one other user-defined marketplaces.

10. The system of claim 1, wherein at least one of said user-defined marketplaces is associated with a geographic classification stored in said information database.

11. The system of claim 10, wherein said geographic classification is user-defined.

12. The system of claim 1, wherein at least one of said user-defined marketplaces is linked with at least one other user-defined marketplace.

13. The system of claim 12, wherein one of said user-defined marketplaces linked to another marketplace inherits listing topics defined within the marketplace to which it is linked.

14. The system of claim 1, wherein access to said user-defined marketplace is restricted based on a set of user-defined access rights.

15. The system of claim 14, wherein said user-defined access rights limit access to said user-defined marketplace to registered users of said user-defined marketplace and registered users of marketplaces that are linked to said user-defined marketplace.

16. The system of claim 1, wherein a user-defined marketplace includes user-defined listing topics.

* * * * *